UNITED STATES PATENT OFFICE.

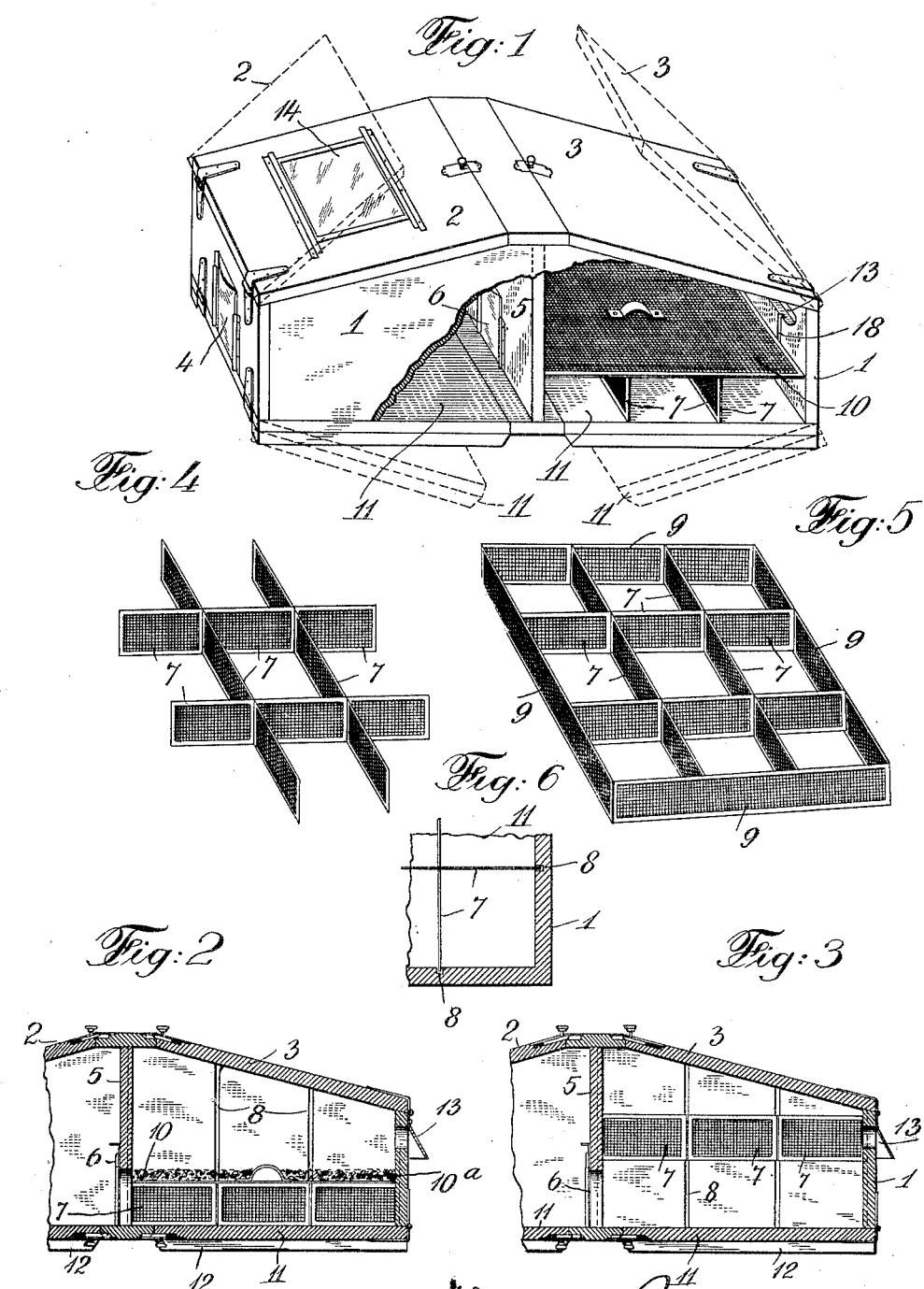

WILLIAM T. ROLPH, OF GENEVA, NEW YORK.

CHICKEN-BROODER.

1,098,531.      Specification of Letters Patent.      Patented June 2, 1914.

Application filed February 1, 1911. Serial No. 605,933.

*To all whom it may concern:*

Be it known that I, WILLIAM T. ROLPH, a citizen of the United States, residing in Geneva, county of Ontario, State of New York, have invented the new and useful Improvements in Chicken-Brooders, of which the following is a specification, as required by statute.

The improvement is an apparatus for housing and protecting recently hatched chicks, being specially adapted for preserving young chicks from suffocation by overcrowding as well as for keeping them in a clean and healthy condition.

The object of the invention is further to provide an efficient and simply constructed apparatus of this kind which may serve as the abode of the young chicks, and within which they may be properly attended to and protected against the weather.

The invention also provides other facilities and advantages which will be apparent to those skilled in the art from the disclosure herein given and the drawings forming part hereof.

In the said drawings Figure 1 is a perspective view of a chicken brooder constructed in accordance with this invention, having a portion of the side wall broken out to expose the interior. Fig. 2 is a central longitudinal section through a portion of the apparatus shown in Fig. 1. Fig. 3 is a similar view of the same portion showing the compartment frame in its raised position. Fig. 4 is a separate view in perspective of the said frame. Fig. 5 a similar view of a modified form of frame and Fig. 6 a detail of the mounting of the frame of Fig. 4.

The foregoing figures illustrate the best form in which I have thus far contemplated employing my invention but it will be readily perceived by those who read the following description and are familiar with the subject, that the principles of the invention are by no means limited to this particular form of embodiment, and that they may be applied to chicken breeding purposes in various different manners within the scope of the disclosure and claims herein given.

In the specific and preferred form taken for illustration, the brooder comprises an inclosure formed of a wooden box or frame 1, of general rectangular or oblong shape and preferably higher at the middle than at the ends so that the covering means or roof thereof will have sufficient pitch to shed water when the device is used out of doors. The brooder is preferably of a size that will adapt it to be readily moved from place to place, so that it may be used indoors or out as desired, but the invention is not limited to any size of brooder inclosure, which may be a stationary structure. In the present instance the roof or covering means is constituted by two independent lids, 2 and 3, hinged to the brooder at the ends of the casing and provided with ordinary spring latches, but it is of course obvious that any suitable means of mounting the roof member or members of the brooder will be equally serviceable, inasmuch as the object in view is merely to provide access for the attendant to the chicks in the interior of the brooder. Entrance and egress for the chicks is preferably provided by an opening in one of the end walls of the brooder on the level of the floor, which is adapted to be closed by any suitable kind of door, such as the slide door shown at 4.

The interior of the brooder is divided into two parts or chambers—one of them, to which entrance is had through the doorway just referred to, may be properly termed an assembly chamber inasmuch as its purpose is to provide a sheltered inclosure in which the chicks may gather at nightfall. The other part or chamber of the brooder is preferably separated from the assembly chamber by a partition 5 through which communication is established by a doorway and door 6. The second chamber contains a series of walls 7 arranged in intersecting planes as shown or in any other suitable manner to provide a number of compartments each having a capacity for about 5 or 6 chicks or such number of them as may be safely kept together in a single inclosure without danger of smothering by crowding. The chicks in each compartment rest on the floor or bottom of the brooder, being kept in separate groups by the partition walls which in the present case are high enough to prevent very young chicks from jumping or climbing over them. The compartment-forming walls are made of perforated metal, wire-cloth, or other kind of foraminous material, so that both air and heat can circulate through the several compartments and the arrangement is such that the said foraminous walls and the floor or bottom of the brooder are relatively movable with respect to each other, preferably so that they can be separated, as for instance, by vertically raising the walls to an upper position indicated in Fig. 3, whereby the chicks are left on the floor of the brooder in an unconfined state with freedom to escape to the outside through the doorway 6.

As illustrated in Fig. 4, the compartment-forming walls are made of two pairs of parallel strips of wire cloth intersecting each other at right angles to form nine, equal, chick-containing compartments and the ends of the strips are confined in vertical, slideway grooves 8 cut in the walls of the chamber, as clearly illustrated by Fig. 6, but this manner of mounting the walls I regard as equivalent to any other means whereby the chicks can be readily relieved from confinement in their several compartments.

The modified form shown in Fig. 5 is the same as that of Fig. 4 with the addition of a boundary wall 9 on each of its four sides, which addition adapts this form of compartment frame to be raised and lowered without forming grooves in the chamber walls, or requiring the frame to fit the brooder chamber with any particular accuracy. Such a frame as Fig. 5 could, for instance, be made relatively small with respect to the area of the brooder floor. While, as above stated, the height of the walls may be sufficient of itself to maintain the chicks separated, the same object can obviously be obtained with lower walls by providing a top cover to the compartments, and I prefer to use a top cover, which is useful also to protect the chicks against outside temperature. This top cover as shown at 10, is also made of wire cloth with a handle and provided with a blanket of cotton wool or other air pervious material, as shown at 10$^a$ in Fig. 2, which will serve to retain heat in the compartments while not obstructing the necessary circulation of air for ventilation. The top cover 10 as thus formed can be removed from the brooder chamber and used only in severe weather, if preferred.

In its preferred form, the structure above described is made with a movable or removable floor, which can be quickly separated from the body of the brooder inclosure for cleansing, and to this end the floor sections 11 are hinged to the casing so that they can swing downwardly, as indicated in Fig. 1, and are provided with spring latches to hold them shut. By raising the casing on its end or side and opening either section, the latter can be brushed clean, which is an advantage of the present brooder of great practical importance. Cleats 12 are attached to the bottoms of the floor sections to permit circulation of air beneath the brooder and so that the knobs of the locking devices will not touch the ground or floor. The brooder is also provided with ventilation openings, such as indicated at 13, and for convenience of inspection it is also supplied with a window in one or both of the cover lids, as indicated at 14, the latter being mounted to open by sliding so that the ventilation can be controlled.

In the use of the new brooder the young chicks are allowed to congregate in the assembly chamber and are then taken by hand and placed in groups of proper number in the several compartments in the other chamber and then, if necessary, covered by the removable cover 10 with or without the air pervious layer of cotton and the brooder is thereupon closed. In this condition the chicks can be safely kept for an indefinite time and will be properly protected against cold and properly ventilated. When it is desired to release them, as in the morning, the brooder is opened and the chicks are allowed to escape by raising the compartment frame to the position indicated in Fig. 3, both doors 4 and 6 being opened if the chicks are desired to be released entirely from the brooder.

I claim—

1. In a chicken brooder, a compartment frame of foraminous material suited for confining young chicks in separated groups in the compartments thereof and provided with a floor common to the several compartments and with respect to which the said frame is relatively vertically movable to permit simultaneous egress for the chicks from their respective compartments in said frame, the size of said compartments being adapted to accommodate the chicks in numbers predetermined to prevent their suffocation by crowding.

2. A chicken brooder comprising a box or casing, having a floor for the chicks and a chick exit passageway leading therefrom, a frame of foraminous material in said casing adapted for vertical movement toward and from the floor and relatively to the walls of the casing, said frame forming several chick-confining compartments of limited capacity open at top and bottom and adapted to coöperate with said floor to confine the chicks in separated groups, the size of said compartments being adapted to accommodate the chicks in numbers predetermined to prevent their suffocation by crowding.

3. A chicken brooder provided with a top lid or cover and a chick exit and interiorly divided into chick-confining compartments of limited capacity open at the top, each of a size to accommodate the chicks in numbers predetermined to prevent their suffocation by crowding, said top lid enabling the chicks to be placed by hand in the open-top compartments, the walls of said compartments being of foraminous material and movable with respect to the bottom or floor of the brooder to permit escape of the chicks through said exit.

4. A chicken brooder provided with a top lid or cover and a chick exit and interiorly divided into chick-confining compartments of limited capacity with open tops suited for confining separated groups of chicks, the walls of said compartment being of foraminous material and relatively movable with respect to the floor of the brooder to permit the escape of the chicks through said exit and a heat-insulating, air-pervious covering removably supported over and protecting said compartments.

5. A chicken brooder divided into two chambers connected by a doorway, and a series of walls in one of said chambers forming three or more open top chick-confining compartments of limited capacity suited for receiving and confining chicks in separated groups, and movable relatively to the floor of the brooder to release the chicks from their compartments, said compartments being normally closed to entrance by the chicks, and a removable cover means therefor whereby the chicks may be placed by hand in said compartments.

6. A chicken brooder divided into two chambers both provided with movable covering means, one of said chambers having an entrance door from the exterior, and a series of walls in the other chamber forming open top, chick-confining compartments, the capacity of each of said compartments adapting it to hold not more than such number of chicks as can be kept together without suffocation by crowding.

7. A chicken brooder divided into two parts or chambers and provided with movable covering means, one of the chambers having a doorway and door leading to the exterior of the brooder whereby the chicks may gather in the brooder, in combination with a series of walls in the other chamber forming open top, chick-confining compartments of limited capacity into which the chicks may be placed by hand only, said walls being movable to afford egress for the chicks from their said compartments.

In testimony whereof, I have signed this specification in the presence of two witnesses.

WILLIAM T. ROLPH.

Witnesses:
FITZHUGH MCGREW,
LANSING G. HOSKINS.

---

Copies of this patent may be obtained for five cents each, by addressing the "Commissioner of Patents, Washington, D. C."